April 29, 1969   D. M. PETERSON ETAL   3,440,939
PHOTOGRAPHIC CAMERA WITH RETRACTILE LENS AND SHUTTER TRIGGER
Filed Jan. 18, 1967
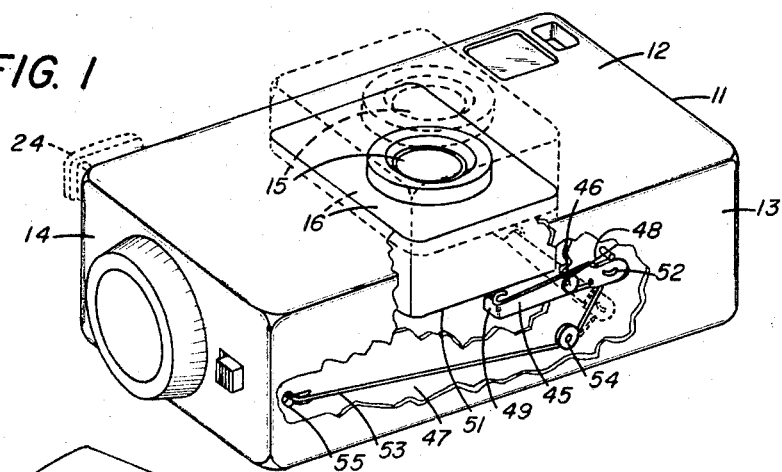
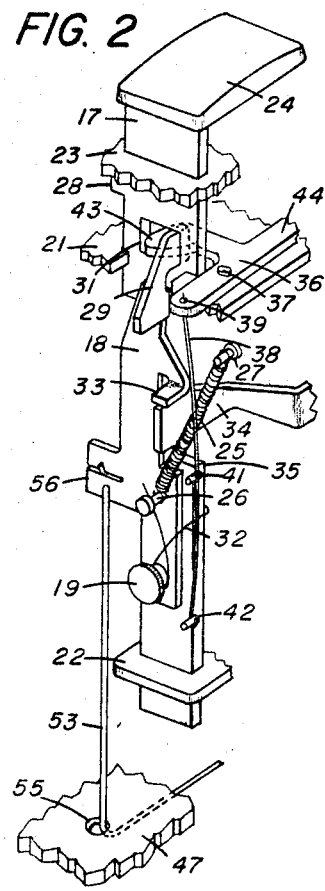
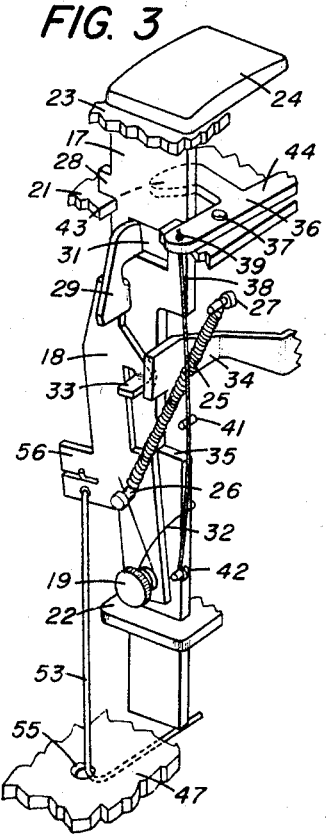
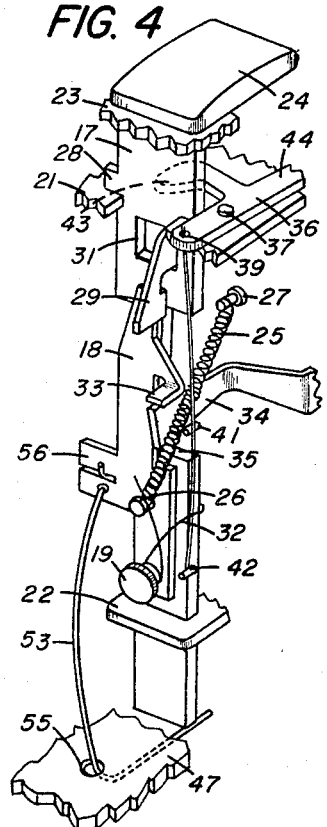
DEAN M. PETERSON
CHARLES E. PICKERING
WILLIAM WINDLE, JR.
INVENTORS
BY Robert W Hampton
Ronald S Varela
ATTORNEYS

United States Patent Office 3,440,939
Patented Apr. 29, 1969

3,440,939
PHOTOGRAPHIC CAMERA WITH RETRACTILE LENS AND SHUTTER TRIGGER
Dean M. Peterson, Charles E. Pickering, and William Windle, Jr., Rochester, N.Y., assignors to Eastman Kodak Company, Rochester, N.Y., a corporation of New Jersey
Filed Jan. 18, 1967, Ser. No. 610,055
Int. Cl. G03b 19/06
U.S. Cl. 95—11                                              10 Claims

ABSTRACT OF THE DISCLOSURE

A photographic camera having a retractile lens housing that retracts the shutter trigger by a cable connection when the lens housing is retracted and without operating the shutter mechanism. Where a trigger blocking mechanism is employed, the blocking mechanism is disabled during such retraction and is restored when the lens housing and trigger are extended.

---

Reference is made to the following commonly assigned copending applications:

U.S. application Ser. No. 610,087, Photographic Camera With Retractile Lens Housing, filed of even date herewith in the names of James F. Scudder and Frederic A. Mindler.

U.S. application Ser. No. 610,100, Photographic Camera With Metered Film Advance and Double Exposure Prevention, filed of even date herewith in the names of Dean M. Peterson, Charles E. Pickering and William Windle, Jr.

The present invention relates to photographic cameras of the type having a retractable objective lens to provide a compact, conveniently carried unit and, more particularly, to such cameras including means whereby the retraction of the objective lens is accompanied by retraction of the shutter trigger supported on a stationary portion of the camera body.

It is well known to provide a camera with means for retracting the lens and its associated housing to reduce the size of the camera when it is not actually being used. In the case of many such cameras, especially so-called folding cameras employing a hinged door supporting the lens and shutter mechanism, it is unlikely that the operator would attempt to make an exposure with the camera still closed, particularly if the shutter trigger is inaccessible behind the closed door when such a camera is closed. However, when using certain other types of cameras with retractile lenses, typically relatively compact cameras of 35 mm. size or smaller, the photographer is not immediately alerted to the position of the camera lens if the lens and its housing are at all times visible and extend only a relatively short distance beyond the camera housing when the camera is ready for use. Therefore, the operator may attempt to operate the camera with the lens still retracted, particularly if the shutter trigger is located at a fixed accessible location on the camera body casing. If the camera shutter is operable by the trigger regardless of the position of the lens, as is the case with some such cameras, this oversight will cause an exposure that is out of focus. To avoid this occurrence, cameras of this type may employ means for blocking actuation of the trigger unless the lens is extended; however, such a blocking feature does not alert the operator to his mistake until he discovers that he is unable to move the trigger.

According to the present invention, the photographer is alerted to the position of the camera lens before an exposure is attempted, by operatively connecting the shutter trigger to the lens retracting mechanism so that the retraction of the lens similarly retracts the trigger to a position visually and tactually distinguishable from its operable position. Further, the present invention improves the accessibility of the shutter trigger by allowing it to extend substantially beyond the adjacent camera structure when the camera is ready for use, while still preserving the compact form of the camera when the lens housing is retracted.

When the extended trigger is manually depressed from its extended to its retracted position in normal camera operation, the shutter is thereby actuated to produce an exposure. However, when the trigger is moved in the same sense in response to retraction of the lens housing, it is essential that such movement does not actuate the shutter. Accordingly, the present invention further provides means to disengage the trigger from the shutter mechanism during retraction of the trigger in response to retraction of the lens housing.

In many cameras in which the above-described features would be desirable, it may also be advantageous to provide means to block depression of the shutter trigger in response to the existence of a condition which would result in a faulty exposure. For example, such means may be associated with a double exposure prevention system to preclude a second actuation of the shutter before the film has been advanced, or with a light evaluating system to avoid exposing the film in the absence of sufficient scene illumination. Therefore, the invention may also include means to override such blocking means during retraction of the trigger in response to retraction of the lens housing, if the trigger would otherwise be blocked thereby, and to restore the previous or correct relation of the blocking means to the trigger when the trigger and lens housing are again extended.

These and other important objectives of the invention will be readily apparent from the following detailed description in which the trigger is referred to as being depressed when it is moved from its extended to its retracted position by the photographer to actuate the shutter and as being retracted when the same movement is effected by retraction of the lens housing. In the accompanying drawings, in which like reference numerals refer to like elements:

FIG. 1 is a perspective view of a camera according to a preferred embodiment of the invention, with portions thereof broken away to show interior details of the mechanism employed to connect the shutter trigger operatively with the movable lens housing;

FIG. 2 is an enlarged, partial perspective view of the trigger mechanism of the subject camera in cooperation with the shutter actuating lever and with a trigger blocking member, showing the relative positions of the illustrated components when the trigger is in its extended position;

FIG. 3 corresponds to FIG. 2 and illustrates the positions of the various depicted components when the trigger is retracted; and FIG. 4 corresponds to FIGS. 2 and 3 and illustrates the positions of the various depicted components when the trigger is depressed.

As illustrated in FIG. 1, the subject camera, which is shown lying on its back, comprises a body casing 11 including a front wall 12, a bottom wall 13, and an end wall 14. The objective lens 15 is supported by lens housing member 16, which is slidably movable between a retracted position, as shown in solid lines, and an extended position, as shown in broken lines.

Resilient means (not shown) may be employed to urge the lens housing toward its extended position, with appropriate releasable latch means being provided to retain the housing in its retracted position when the camera is not being used. Since the present invention does not relate to the particular structure employed for such purposes, the details thereof are not shown, an appropriate example of such a camera construction being disclosed in a commonly assigned copending U.S. application 610,087 entitled Photographic Camera With Retractile Lens Housing, filed on even date herewith in the names of James F. Scudder and Frederic A. Mindler.

Referring now to FIG. 2, the shutter trigger mechanism comprises a trigger member 17 including a latch member 18 pivotally attached to member 17 at 19. The trigger member is slidably supported within the camera body basing 11 by fixed, internal support members 21 and 22, with the upper end of the trigger member extending through the top wall (a portion shown at 23) of the body casing. At its top end, the trigger member 17 is provided with a button or finger plate 24, which is raised above top wall 23 when the trigger is in its extended position, as shown in FIG. 2 and in broken lines in FIG. 1.

A tension spring 25, located between a pin 26 on latch member 18 and a pin 27 affixed to a stationary support member (not shown) within the camera casing, urges the trigger member toward its extended position, as defined by the engagement of a stop lug 28 on trigger 17 with the lower surface of top wall 23. Due to the angular position of spring 25, it also tends to maintain the latch member in the substantially vertical position shown in FIG. 2, in which position an ear 29, extending into a rectangular hole 31 of member 17, abuts against the forward edge surface of the hole. To supplement the rotative influence of spring 25, tending to maintain the latch member in this position, a supplementary spring member may also be provided as shown at 32.

When the latch member is in the substantially vertical position previously described, an outwardly extending lip 33 thereof is positioned above and in alignment with a shutter operating lever 34, the end of which is located in an elongate notch 35 in the trigger member 17 and is movable downwardly against the influence of resilient means (not shown) to operate the camera shutter in a manner known, per se.

A trigger blocking member 36, pivotally mounted on support member 21 by a pivot pin 37, is rotatively biased toward the position shown in FIG. 2 by a light spring wire 38 supported adjacent a stationary support member (not shown) by pins 41 and 42 thereon, with the upper end of the wire passing through hole 39 in the blocking member. In this position, nose portion 43 of the blocking member 36 projects into rectangular hole 31 of trigger member 17 and thereby blocks the trigger member from being depressed to actuate the camera shutter. An inwardly projecting arm of the blocking member 36, a portion of which is shown at 44, is operatively engaged by a trigger blocking mechanism (not shown) of the type previously mentioned, whereby the blocking member is pivotally moved against the influence of spring wire 38 to withdraw nose portion 43 from hole 31 if conditions to which the trigger blocking mechanism is responsive are suitale for producing a satisfactory exposure. An example of a trigger blocking mechanism cooperating with a shutter trigger in this manner for double exposure prevention purposes is shown and described in commonly assigned copending U.S. application 610,110 entitled Photographic Camera With Metered Film Advance and Double Exposure Prevention, filed on even date herewith in the names of Dean M. Peterson, Charles E. Pickering and William Windle, Jr.

Referring again to FIG. 1, the construction employed for retracting the trigger in response to retraction of the lens housing includes a lever 45 pivotally attached by stud 46 to an inner support plate 47 adjacent wall 13 of the cemera body casing and resiliently urged in a clockwise direction, as illustrated, by a light spring member 48. At one end thereof, lever 45 is provided with an upwardly turned shoe portion 49 slidably engaging the adjacent rearward edge 51 of lens housing 16, by which the lever 45 is moved to the position shown in solid lines when the lens housing is in its retracted position and assumes the position shown in broken lines when the housing is extended. As indicated by numeral 52, the opposite end of the lever has attached thereto an end of a flexible cable 53, extending around a guide bushing 54 and upwardly through a guide hole 55 located in plate 47 below the trigger mechanism. The upwardly extending end of the cable 53 is secured to an extension arm 56 on latch member 18 as shown in FIG. 2. Accordingly, movement of the lens housing from its extended position to its retracted position causes lever 45 to move from the position shown in broken lines to the position shown in solid lines, thereby pulling cable 53 and moving the cable end attached to the latch member 18 in a downward direction.

In order that the retraction of the trigger member by cable 53 will not operate the camera shutter and will not be blocked if the trigger blocking member happens to be in the blocking position shown in FIG. 2, the relation of extension arm 56 to pivot 19 and to springs 25 and 32 is such that the downward force of cable 53 rotates the latch member 18 in a counterclockwise direction, to the angular position defined by engagement of ear 29 with the rearward edge of hole 31, before the trigger is retracted against the influence of spring 25. Such movement of the latch member 18 moves lip 33 out of alignment with shutter operating lever 34. Also, if the nose portion 43 of blocking member 36 is received within hole 31, it is engaged by ear 29 and thereby cammed out of the hole against the influence of light spring wire 38. When the latch member 18 has completed its movement relative to the trigger member 17, further movement of cable 53 retracts the trigger mechanism to the position shown in FIG. 3, in which finger plate 24 is adjacent the top wall 23 of the camera body casing, with stop lug 28 being adjacent support member 21. During such movement, the latch member 18 remains in its angular position shown in FIG. 3 due to the tension exerted by cable 53 and, therefore, does not disturb the shutter operating lever 34.

While the lens housing remains retracted, the trigger mechanism likewise is held in its retracted position by cable 53. When the lens housing is again moved to its extended position, either manually or by the resilient means previously mentioned, lever 45 is moved toward the position shown in broken lines by spring 48 and by the force exerted through cable 53 by spring 25. Thus, as the lever returns to its former position, the trigger mechanism is simultaneously returned to its extended position. If the trigger mechanism previously was blocked against depression by the blocking member 36 and the blocking condition remained, the nose portion 43 remained in resilient contact with the adjacent surface of the trigger member 17 above hole 31 while the trigger was retracted. In that case, blocking member 36 reassumes its former position, extending into hole 31, upon return of the trigger mechanism to its extended position.

When the operator presses downwardly on extended finger plate 24 to actuate the camera shutter, depression of the trigger member will be blocked if the blocking member is in the position shown in FIG. 1. Assuming, however, that the trigger blocking mechanism has withdrawn nose portion 43 of member 36 from hole 31, the downward force exerted on the plate 24 causes the trigger member to be depressed against the resistance of spring 25 and toward the position shown in FIG. 4. Since the extended trigger indicates that the lens housing is also extended, movement of the trigger mechanism produces slack in cable 53. Therefore, cable 53 cannot move the latch member 18 from its original position relative to the trigger member 17. Accordingly, as the trigger member 17 moves downwardly to the fully depressed position shown in FIG. 4, lip 33 of the latch member 18 engages the adjacent end of shutter operating lever 34 and moves that end of the lever downwardly to actuate the camera shutter. When the operator releases plate 24, the trigger mechanism and the shutter actuating lever return to their respective positions shown in FIG. 1. If the blocking member is associated with a double exposure prevention mechanism, the nose portion 43 then will enter hole 31 to prevent a subsequent depression of the trigger prior to advancement of the camera film. Alternatively, the double exposure mechanism might comprise means (not shown) for releasably retaining the trigger mechanism in its depressed position following each exposure and for releasing the mechanism to return to its extended position in response to the subsequent advancement of the film. If such a construction were employed, the illustrated blocking member might be incorporated therein to hold the trigger in its depressed position, or, if not utilized for that purpose, might be retained nevertheless to prevent depression of the trigger under other circumstances, such as the existence of insufficient scene illumination.

Since these and other alternative constructions and modifications may be made without departing from the spirit of the invention, the foregoing detailed description of a preferred embodiment is to be considered as illustrative only and not as limiting the scope of the invention.

We claim:

1. In a photographic camera, the combination comprising:
    (a) a body casing,
    (b) a trigger member movable between a first position and a second position,
    (c) a shutter actuating member,
    (d) latch means for operatively associating said shutter actuating member with said trigger member to actuate the shutter in response to movement of said trigger member from said first position to said second position,
    (e) a housing movable relative to said casing and said trigger between an extended position and a retracted position,
    (f) connecting means operatively connecting said housing with said trigger member for retracting said trigger member from said first position to said second position in response to movement of said housing from said extended position to said retracted position, and
    (g) latch disabling means for operatively disassociating said shutter actuating member from the trigger member during retraction of said trigger member from said first position to said second position by said connecting means.

2. The combination according to claim 1 in which said latch means comprises a latch member supported on said trigger member and movable relative thereto between;
    (a) a first location in which said latch member engages the shutter actuating member during movement of said trigger from said first position to said second position, and
    (b) a second location in which said latch member bypasses said shutter actuating member during said movement of said trigger.

3. The combination according to claim 2 in which said latch disabling means moves said latch member to said second location during movement of said housing from said extended position to said retracted position and restores said latch member to said first location when said housing is returned to said extended position.

4. The combination according to claim 1 in which said connecting means comprises a centrally pivoted lever in engagement at one end thereof with said housing for pivotal movement in response to movement of said housing, and a flexible cable operatively connecting the other end of said lever to said trigger member to translate retractive movement of said housing into retractive movement of said trigger member.

5. The combination according to claim 1 and further comprising:
    (a) blocking means for blocking movement of said trigger member from said first position to said second position, and
    (b) overriding means for disabling said blocking means to allow retraction of said trigger member from said first position to said second position by said connecting means.

6. The combination according to claim 1 in which said trigger member includes an externally accessible button positioned beyond said body casing when said trigger member is in said first position and positioned in close against said body casing when said trigger member is in said second position.

7. In a photographic camera, the combination comprising:
    (a) a body casing,
    (b) a trigger member movable between
        (1) a first position and
        (2) a second position,
    (c) a shutter operating member movable between
        (1) an initial position and
        (2) a shutter actuating position,
    (d) a latch member supported on said trigger and movable relative thereto between
        (1) a first location in which said latch member engages and displaces said shutter operating member from said initial position to said shutter actuating position during movement of said trigger member from said first position to said second position and
        (2) a second location in which said latch member bypasses said shutter operating member during movement of said trigger member from said first position to said second position,
    (e) a lens housing movable relative to said casing and said trigger between
        (1) an extended position and
        (2) a retracted position,
    (f) motion translating means for sequentially moving said latch member from said first location to said second location and said trigger member from said first position to said second position in response to movement of said lens housing from said extended position to said retracted position, and
    (g) return means for returning said trigger member to said first position and said latch member to said first location in response to movement of said lens housing from said retracted position to said extended position.

8. The combination according to claim 7 in which said motion translating means comprises a flexible cable connected at one end to said latch member, and a motion translating lever operatively connecting the other end of said cable to said lens housing.

9. The combination according to claim 7 and further comprising:
    (a) blocking means for preventing movement of said trigger member from said first position, and
    (b) disabling means associated with said latch member for disabling said blocking means to allow movement of said trigger when said latch member is in said second location.

10. The combination according to claim 9 in which said blocking means comprises a blocking member resiliently movable into the path of movement of a blocking surface defined by said trigger member, said disabling means comprising a disabling surface defined by said latch member and engageable with said blocking member to displace said blocking member from the path of movement of said blocking surface when said latch member is in said second location.

References Cited
UNITED STATES PATENTS

| | | | |
|---|---|---|---|
| 2,193,019 | 3/1940 | Christie | 95—39 |
| 2,890,638 | 6/1959 | Rentschler | 95—39 |
| 3,358,572 | 12/1967 | Streissunger | 95—11 |

JOHN M. HORAN, *Primary Examiner.*

CHARLES E. SMITH, *Assistant Examiner*